United States Patent [19]
Muffat et al.

[11] 3,787,189
[45] Jan. 22, 1974

[54] APPARATUS FOR MIXING FLUIDS IN A VESSEL BETWEEN BEDS OF SOLIDS

[75] Inventors: Donald L. Muffat, Lansing, Ill.; John B. Clark, Hammond; Lyle M. Lovell, Portage, both of Ind.

[73] Assignee: Standard Oil Company, Chicago, Ill.

[22] Filed: Dec. 17, 1971

[21] Appl. No.: 209,290

[52] U.S. Cl. .............. 23/288 R, 23/283, 23/284, 23/288 K, 208/48 Q, 208/108, 239/552, 261/79 A
[51] Int. Cl. .......................... B01j 9/04, B05b 1/26
[58] Field of Search...... 23/288 R, 288 K, 289, 287, 23/284; 208/48 Q, 108, 146; 239/504, 552, 590; 261/79 A

[56] References Cited
UNITED STATES PATENTS 3,480,407  11/1969  Wentworth et al. ............. 23/288 R
1,557,112  10/1925  Schneible ......................... 261/97 A
1,670,743  5/1928   Schneible .................. 261/97 A UX
3,366,461  1/1968   Christensen ......................... 23/289
3,443,910  5/1969   Newman et al. ................. 23/288 R Primary Examiner—Joseph Scovronek
Attorney, Agent, or Firm—Arthur G. Gilkes et al.

[57] ABSTRACT

The apparatus comprises a plurality of baffles positioned in the vessel so as to be perpendicular to the flow of fluids through said vessel and a plurality of sets of swirl vanes that are assembled in such a manner that a fluid medium being introduced into the vessel between beds of solids will be intimately admixed with other fluids that are passing through the vessel from one bed of solids to another.

19 Claims, 9 Drawing Figures

PATENTED JAN 22 1974 3,787,189

APPARATUS FOR MIXING FLUIDS IN A VESSEL BETWEEN BEDS OF SOLIDS

BACKGROUND OF THE INVENTION

Processes for the hydroprocessing of petroleum hydrocarbon streams are employed in many of the modern day petroleum refineries. In some of these processes, certain types of reactions that occur are extremely exothermic. Generally, in such a process for the hydroprocessing of petroleum hydrocarbons, either mixed-phase fluid reactants or reactants in the vapor phase are passed continuously through one or more treating zones in a reaction vessel. Ordinarily, there are a plurality of treating zones, each zone comprising a fixed bed of a solid contact material, for example, a solid catalyst. As the reactants and partially processed fluids pass serially through the various zones or fixed beds, a considerable amount of heat is evolved.

A convenient way to offset the heat evolved and to control such exothermic reactions is to use s fluid quench medium, which may be either a liquid or a gas. Conveniently, such fluid quench medium may be introduced into the reactor to be intermingled with the stream of reactants and partially processed fluids in the void spaces between two treating zones. However, if such fluid quench medium is to effectively counteract the heat evolved and control the exothermic reaction, the fluid quench medium and the moving fluids must be blended and mixed thoroughly prior to their introduction into the subsequent treating zone.

The apparatus of the present invention may be employed suitably to provide efficient mixing of a fluid quench medium and the reactants and partially processed fluids that are emitted from a treating zone in a hydroprocessing reactor. The resulting mixture of fluid quench medium and reactants and partially processed fluids is then introduced into the first subsequent treating zone that is located in the reactor downstream from that treating zone from which the reactants and partially processed fluids were obtained.

SUMMARY OF THE INVENTION

According to the present invention there is provided an apparatus for mixing fluids in a vessel between beds of solid contact material that are located in said vessel. Broadly, this apparatus comprises: a first baffle which is centrally positioned from the walls of said vessel that are parallel to the flow of fluids through said vessel and which is not connected to said walls; a second baffle having a central opening and being positioned donwstream from said first baffle such that said first baffle is located directly opposite said central opening of said second baffle on the upstream side of said second baffle, the cross-sectional area of said first baffle being greater than the cross-sectional area of said central opening of said second baffle and said second baffle extending to said walls, said first baffle and said second baffle being perpendicular to the flow of fluids through said vessel; a first plurality of swirl vanes connected to said first baffle on the downstream side of said first baffle, said first plurality of swirl vanes being supported on said second baffle and being positioned in a manner that will direct fluids that are passing through said vessel and between said first baffle and said second baffle in a swirling motion toward the axis of said vessel that is parallel to the flow of fluids through said vessel and subsequently through said central opening in said second baffle; a second plurality of swirl vanes connected to the downstream side of said second baffle; and a third baffle that is positioned on the downstream side of said second baffle directly opposite said central opening of said second baffle and that is firmly attached to said second plurality of swirl vanes, said second plurality of swirl vanes being positioned to direct in a swirling manner the fluids which are passing through said central opening of said second baffle and which are impinging upon the upstream side of said third baffle toward said walls of said vessel.

The cross-sectional area of the third baffle may be greater than the cross-sectional area of the central opening in the second baffle. The third baffle may be parallel to the first and second baffles. Moreover, all three baffles may be parallel and each may be a plate. On the other hand, the first baffle and the second baffle may be plates, while the third baffle may be an inverted conical baffle that is curved in such a manner as to direct the fluids outwardly from the axis of the vessel towards the walls of the vessel that are parallel to the flow of fluids through the vessel.

Suitably, the apparatus of the present invention may be employed in either a vertical vessel or a horizontal vessel.

An embodiment of the present invention may be used to effectively control the exothermic reactions occurring in a hydrocracking reactor.

BRIEF DESCRIPTION OF THE DRAWINGS

This document is accompanied by nine figures.

FIG. 6 shows diagrammatically in elevation the arrangement of this embodiment.

DESCRIPTION AND PREFERRED EMBODIMENT

Figure 1:
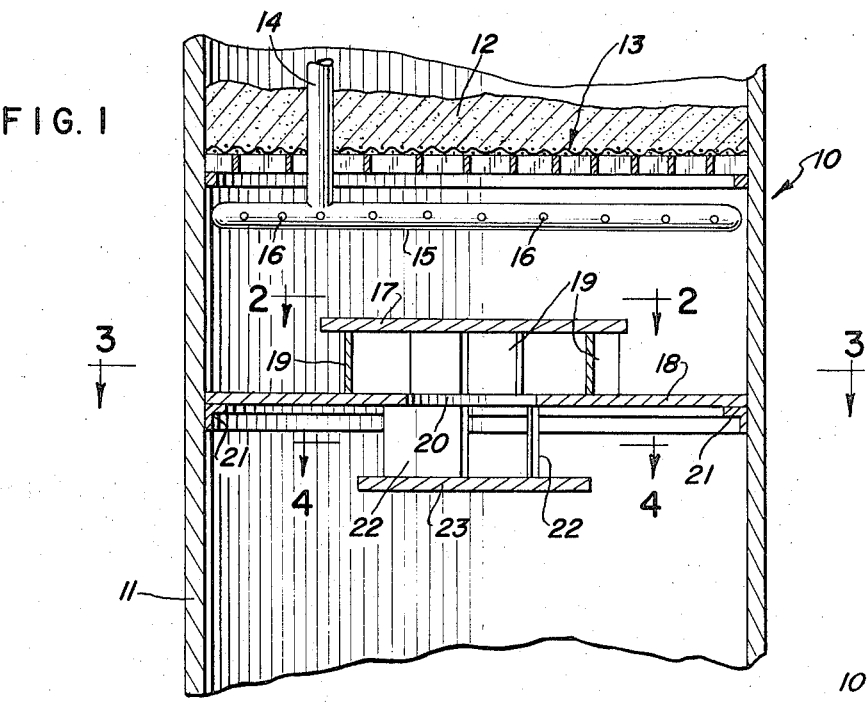
FIG. 1 presents a vertical cross-sectional view of a portion of a vertical hydrocracking reactor and an embodiment of the apparatus of the present invention suspended therein. It shows diagrammatically in elevation the arrangement of the apparatus.
Figure 2:
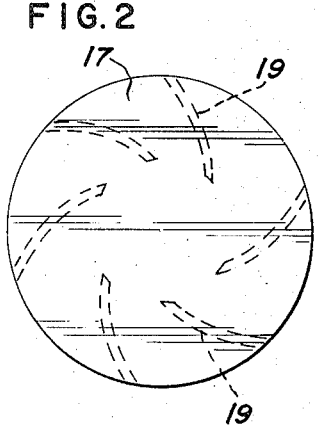
FIG. 2 depicts diagrammatically in a plan view the top horizontal baffle plate of the apparatus and its associated swirl vanes as seen along line 2—2 of FIG. 1.
Figure 3:
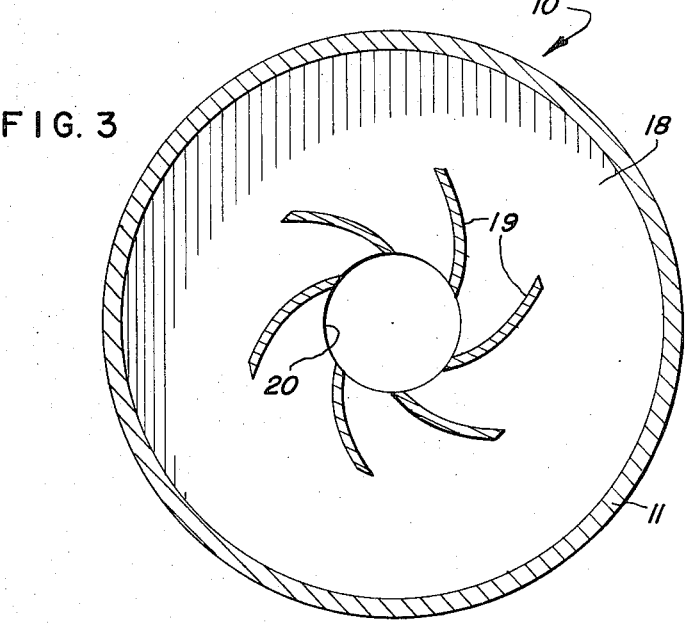
FIG. 3 shows a cross-sectional view of the middle horizontal baffle plate, as seen along line 3—3 of FIG. 1.
Figure 4:
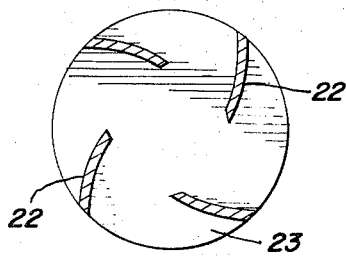
FIG. 4 shows diagrammatically in a plan view the bottom horizontal baffle plate and its associated swirl vanes, as seen along line 4—4 of FIG. 1.

It may be desired to introduce a relatively cool fluid into a vessel to be mixed with relatively hot effluent descending in the vessel from a first bed of particulate solid contact material prior to the introduction of said hot effluent into a second bed of particulate solid contact material located downstream from said first bed. This would be a suitable way for controlling the temperature of the hot effluent.

Today, processes directed to the hydroprocessing of petroleum hydrocarbon streams are used in many petroleum refineries. In such processes, there may be a need for thoroughly mixing one fluid medium with one or more different fluid media, which different fluid media are passing through a vessel from a first zone containing a fixed bed of particulate solid contact material to a second zone located directly downstream from the first. Such a mixing of fluids is quite important, if the process is one that is associated with exothermic reactions and that employs a catalyst as the particulate solid contact material. The heat generated by such exothermic reactions must be offset or controlled to ensure efficient operation. This may be done conveniently by employing a cooler liquid or gaseous fluid to cool the hot effluent passing from one catalyst zone or bed to another. This effluent would comprise products and unconverted reactants.

An example of a process for the hydroprocessing of petroleum fractions is a hydrocracking process in a typical fixed bed reactor wherein petroleum hydrocarbons are hydrocracked. The hydrocracking catalyst is positioned in a number of beds, which are interspaced by void spaces. A fluid quench medium, such as hydrogen or a hydrogen-containing gas, is introduced into each of these void spaces between the catalyst beds to quench the hot fluids that are passing from one catalyst bed to another. If the fluid quench medium is to provide effective cooling of the hot fluid stream passing between catalyst beds, it must be thoroughly mixed therewith.

There has now been developed an apparatus that may be employed to mix one fluid medium with one or more other fluids. This apparatus is conveniently employed to mix fluids in a vertical vessel. Moreover, with suitable modifications it may be used in a horizontal vessel. More particularly, the apparatus may be employed to mix a cool fluid quench medium with a stream of hot fluids being emitted from a bed of solid contact material. This mixing is done prior to the introduction of the resulting mixture of fluid quench medium and hot fluids into the next subsequent bed of solid contact material that is positioned directly downstream from the bed of contact material from which the hot partially processed fluids were obtained.

Broadly, this apparatus for mixing fluids in a vessel between beds of solid contact material located in the vessel is an apparatus which comprises: a first baffle which is centrally positioned from the walls of said vessel that are parallel to the flow of fluids through said vessel and which is not connected to said walls; a second baffle having a central opening and being positioned downstream from said first baffle such that said first baffle is located directly opposite said central opening of said second baffle on the upstream side of said second baffle, the cross-sectional area of said first baffle being greater than the cross-sectional area of said central opening of said second baffle and said second baffle extending to said walls, said first baffle and said second baffle being perpendicular to the flow of fluids through said vessel; a first plurality of swirl vanes connected to said first baffle on the downstream side of said first baffle, said first plurality of swirl vanes being supported on said second baffle and being positioned in a manner that will direct fluids that are passing through said vessel and between said first baffle and said second baffle in a swirling motion toward the axis of said vessel that is parallel to the flow of fluids through said vessel and subsequently through said central opening in said second baffle; a second plurality of swirl vanes connected to the downstream side of said second baffle; and a third baffle that is positioned on the downstream side of said second baffle directly opposite said central opening of said second baffle and that is firmly attached to said second plurality of swirl vanes, said second plurality of swirl vanes being positioned to direct in a swirling manner the fluids which are passing through said central opening of said second baffle and which are impinging upon the upstream side of said third baffle toward said walls of said vessel.

In one embodiment of the apparatus of the present invention, the cross-sectional area of the third baffle is greater than the cross-sectional area of the opening of said second baffle. In another embodiment, the cross-sectional area of the third baffle need not be greater than the cross-sectional area of the central opening of said second baffle. This is the case when the third baffle is an inverted conical baffle having its apex toward said second baffle. This inverted conical baffle, described hereinafter, is curved in such a manner as to direct the fluids that are passing through the central opening of said second baffle and impinging upon the third baffle outwardly from the axis of said vessel toward the walls of said vessel.

In an embodiment of the apparatus of the present invention, both the first baffle and the third baffle and the central opening in the second baffle have circular cross sections. Either or both of the first baffle and the third baffle may be connected or attached to the walls of said vessel so long as they are connected to the walls in a manner that will permit fluids to pass around the respective baffle in the direction of flow of fluids through the vessel (such connections are not shown in the accompanying drawings). In other words, such connections must not impede the flow of fluids through the vessel. Of course, the second baffle has a cross-sectional area which corresponds to the cross-sectional area of the vessel, excluding the central opening in the second baffle. The second baffle is joined to the walls of the vessel and such joint may be sealed with a sealant, such as asbestos wicking. The use of such a sealant minimizes the flow of fluids between the second baffle and the walls of the vessel, thus permitting essentially all of the fluids passing through the vessel to pass through the central opening of said second baffle.

The apparatus of the present invention may be employed advantageously to mix fluids between beds of solid catalyst in a reactor. Preferably, the reactor is a vertical reactor. However, the apparatus may be employed in a horizontal reactor. Of course, for such application suitable modifications would be made to the apparatus. Such modifications are well-known to those skilled in the art; hence, they need not be discussed further.

If the reactor is a cylindrical reactor, the embodiment of the apparatus of the present invention that may be employed therein suitably may have baffles that possess circular cross sections. In addition, the central opening of any baffle may have a circular cross-section. Typically, the baffles will be baffle plates. Accordingly, an embodiment of the present invention is an apparatus for mixing fluids in a reactor between beds or zones of catalyst located in said reactor. This apparatus comprises: a first baffle plate which is centrally positioned from the walls of said reactor that are parallel to the flow of fluids through said reactor and which is not connected to said walls; a second baffle plate having a central opening and being positioned downstream from said first baffle plate such that said first baffle plate is located directly opposite said central opening of said second baffle plate on the upstream side of said second baffle plate, the cross-sectional area of said first baffle plate being greater than the cross-sectional area of said central opening of said second baffle plate and said second baffle plate extending to said walls of said reactor, said first baffle plate and said second baffle plate being perpendicular to the flow of fluids through said reactor; a first plurality of swirl vanes connected to said first baffle plate on the downstream side of said first baffle plate, said first plurality of swirl vanes being supported on said second baffle plate and being positioned in a manner that will direct fluids that are passing through said reactor and between saif first baffle plate and said second baffle plate in a swirling motion toward the axis of said reactor that is parallel to the flow of fluids through said reactor and subsequently through said central opening in said second baffle plate; a second plurality of swirl vanes connected to the downstream side of said second baffle plate; and a third baffle that is positioned on the downstream side of said second baffle plate directly opposite said central opening of said second baffle plate and that is firmly attached to said second plurality of swirl vanes, said second plurality of swirl vanes being positioned to direct in a swirling manner the fluids that are passing through the central opening of said second baffle plate and that are impinging upon the upstream side of said third baffle toward said walls of said reactor.

This reactor may be a vertical reactor. Then the first baffle plate and the second baffle plate would be horizontal baffle plates. Moreover, the third baffle could be a plate. In such case, it advantageously would be parallel to said second baffle plate and would have a cross-sectional that is greater than the cross-sectional area of the central opening of the second baffle plate. Alternatively, the third baffle may be an inverted conical baffle as described hereinafter.

A particularly preferred embodiment of the apparatus of the present invention is an apparatus for mixing fluids in a vessel between beds of catalyst located in said vessel, which apparatus comprises: a first baffle which is centrally positioned from the walls of said vessel that are parallel to the flow of fluids through said vessel and which is not connected to said walls; a second baffle having a central opening and being positioned downstream from said first baffle such that said first baffle is located directly opposite said central opening of said second baffle on the upstream side of said second baffle, the cross-sectional area of said first baffle being greater than the cross-sectional area of said central opening of said second baffle, said first baffle and said second baffle being perpendicular to the flow of fluids through said vessel; a first plurality of swirl vanes connected to said first baffle on the downstream side of said first baffle, said first plurality of swirl vanes being supported on said second baffle and being positioned in a manner that will direct fluids that are passing through said vessel and between said first baffle and said second baffle in swirling motion toward the axis of said vessel that is parallel to the flow of fluids through said vessel and subsequently through said central opening in said second baffle; a third baffle having a central opening and being positioned downstream from said second baffle such that the central opening of said third baffle and the central opening of said second baffle are opposite one another, the cross-sectional area of said central opening of said third baffle being at least as great as the cross-sectional area of said central opening of said second baffle, said third baffle extending to said walls of said vessel; a second plurality of swirl vanes connected to said second baffle on the downstream side of said second baffle and connected to said third baffle on the upstream side of said third baffle, said second plurality of swirl vanes being curved in a direction that is opposite to the direction in which said first plurality of swirl vanes is curved, said second plurality of swirl vanes being positioned to direct fluids passing between said second baffle and said third baffle in a swirling manner toward the axis of said vessel that is parallel to the flow of fluids through said vessel and subsequently through said central opening of said third baffle; a third plurality of swirl vanes connected to the downstream side of said third baffle; and a fourth baffle that is positioned on the downstream side of said third baffle directly opposite said central opening of said third baffle and that is firmly attached to said third plurality of swirl vanes, said third plurality of swirl vanes being positioned to direct the fluids that are passing through said central opening of said third baffle and that are impinging upon the upstream side of said fourth baffle in a swirling motion toward said walls of said vessel.

Suitably, the apparatus of the present invention is an apparatus for mixing fluids in a reaction zone between catalyst beds that are located in that particular reaction zone. This has been pointed out above. Furthermore, such an apparatus may be employed advantageously to mix a gaseous quench medium with the reactants and products that are flowing between catalyst beds in a hydrocracking reactor. When employed in this way, the apparatus promotes the mixing of gaseous quench medium, for example, a hydrogen-containing gas, with the hot partially processed fluids that are passing from one fixed bed of catalyst in the hydrocracking reaction zone to a subsequent bed of catalyst. This provides a means for controlling the temperature rise brought about by the exothermic reactions occurring in the hydrocracking catalyst bed.

Various other embodiments of the apparatus of the present invention are possible. A preferred embodiment of the apparatus is one in which each of the baffles is a plate that is placed in the reactor perpendicular to the flow of fluids through the reactor. Preferably, each of the plates is circular and the opening in any intermediate baffle plate has a circular cross section. If the last baffle is a plate, it is desirable that the cross-sectional area of that plate be greater than the cross-sectional area of the central opening in the intermediate plate that is located directly upstream from the last plate. This permits the fluids that are passing through the central opening of the intermediate baffle to pass outwardly between the last plate and the intermediate plate located directly upstream from the last plate and the plurality of swirl vanes that is positioned between these two plates. If the cross-sectional area of the last plate were no larger than that of the central opening in the intermediate plate located directly upstream, the fluids passing through that central opening could immediately spread out and pass downstream without encountering any plurality of swirl vanes to provide a swirling motion, thus minimizing further mixing of the fluids.

Figure 5:
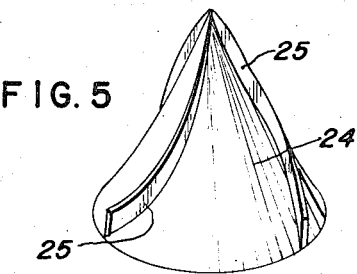
FIG. 5 presents an isometric view of an alternative bottom baffle, which baffle is in the form of a curved inverted cone.
Figure 6:
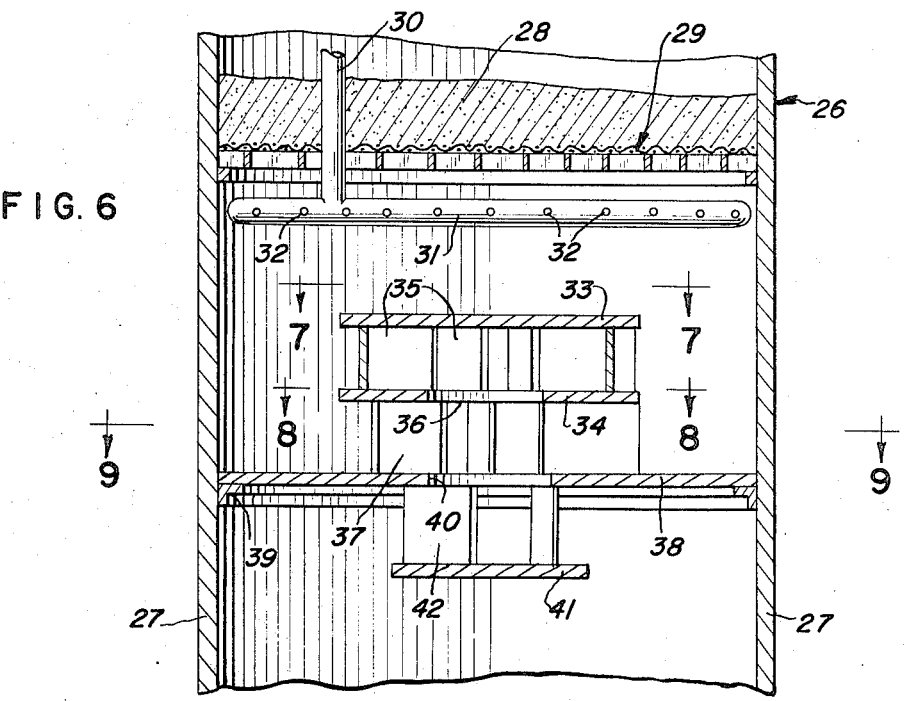
FIG. 6 presents a vertical cross-sectional view of a portion of a vertical hydrocracking reactor and another embodiment of the apparatus of the present invention suspended therein.
Figure 7:
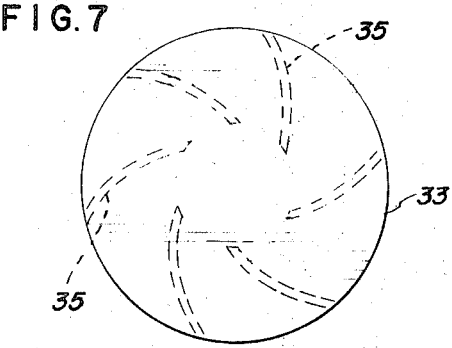
FIG. 7 presents diagrammatically a plan view of the top horizontal baffle plate of the apparatus and its associated swirl vanes as seen along line 7—7 of FIG. 6.
Figure 8:
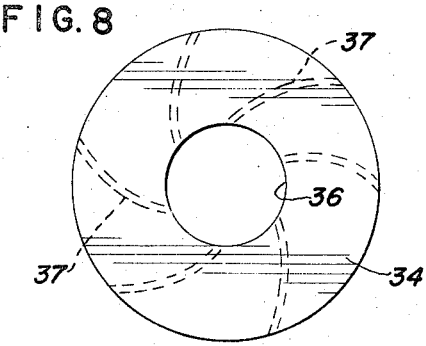
FIG. 8 depicts diagrammatically a cross-sectional view of the top intermediate baffle plate and the swirl vanes that are connected to its bottom-side, as seen along line 8—8 of FIG. 6.
Figure 9:
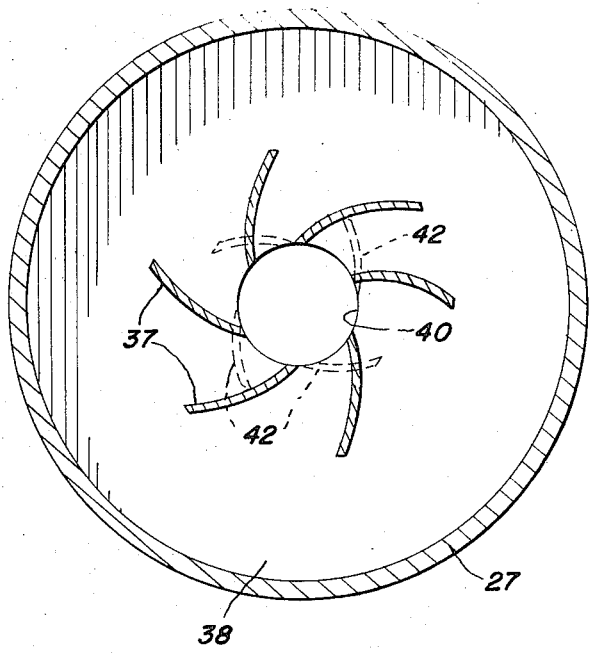
FIG. 9 shows diagrammatically a cross-sectional view of the bottom intermediate baffle plate and both sets of swirl vanes that are attached thereto, as seen along line 9—9 of FIG. 6.

Various modifications may be made to the apparatus of the present invention, many of which would be apparent to those skilled in the art. Such modifications are considered to be within the scope of the present invention. For example, as suggested hereinabove, the last baffle need not be a flat plate. It is contemplated that the last baffle could be an inverted conical baffle which is curved in such a manner as to direct the fluids passing downwardly through the central opening of the preceding intermediate baffle outwardly towards the vertical walls of the containing vessel. Furthermore, such curved inverted conical baffle could be augmented by a plurality of swirl vanes on the upstream side of said conical baffle. Such swirl vanes will modify the swirling motion of the fluids and minimize the area over which the fluids will pass as they are directed toward the vertical walls of the vessel. Such a modified last baffle is depicted in FIG. 5 in an isometric view. The curved conical baffle 24 is augmented by the plurality of swirl vanes 25.

Suh a modified baffle would be connected by suitable means to said preceding baffle in such a manner as not to restrict or impede the flow of fluids outwardly into the containing vessel. It is further contemplated that the cross-sectional area of the base of this inverted curved baffle need not be any larger than the cross-sectional area of the central opening in the preceding baffle.

As pointed out hereinabove, neither the first baffle nor the last baffle in the apparatus need be connected to the walls of the containing vessel. However, it is contemplated that either the first baffle or the last baffle may be connected to the walls in such a manner as not to restrict or impede the flow of fluids through the vessel. In any embodiment of the apparatus in which there is more than one intermediate baffle, those intermediate baffles which do not extend to the walls of the vessel that are parallel to the flow of fluid through the vessel may also be connected to the walls in such a manner as not to impede or restrict the flow of fluids through the vessel (such connections are not shown in the accompanying drawings).

While the embodiments of the apparatus of the present invention that are described hereinabove contain either three baffles or four baffles, it is believed that there could be an embodiment of the apparatus in which there would be more than four baffles. In such case, there would be found a plurality of swirl vanes between each set of adjacent baffles.

The apparatus of the present invention and its use may be more easily understood after the following examples have been considered.

EXAMPLE I

An embodiment of the apparatus of the present invention is presented in FIGS. 1 through 4. In this embodiment, a light gas oil is hydrocracked in reactor 10, which has vertical side walls 11. This feedstock, along with a hydrogen-affording gas, passes through catalyst bed 12 and is partially converted to products. The unconverted feed, hydrogen-affording gas, and products that are formed in the reactor in catalyst bed 12 pass through catalyst bed 12 and catalyst-bed support 13. Quench gas passes through quench line 14 and quench-gas distributor 15 to be emitted from distributor 15 through openings 16 into reactor 10, where it is contacted with the reactants and products descending from catalyst-bed support 13. The fluids then contact an embodiment of the apparatus of the present invention, which embodiment comprises three horizontal baffle plates, baffle plates 17, 18, and 23, a first plurality of swirl vanes 19, and a second plurality of swirl vanes 22, assembled as depicted in the accompanying FIGS. 1 through 4.

The fluids descend in reactor 10 until they meet either of the two horizontal baffle plates 17 and 18. Horizontal baffle plate 17 is the top horizontal baffle plate, or the first horizontal baffle plate. Horizontal baffle plate 18 is the middle horizontal baffle plate, or second horizontal baffle plate; is located below horizontal baffle plate 17; and has a circular central opening 20. Horizontal baffle plate 17 is circular and has a diameter which is greater than the diameter of the circular central opening 20 of horizontal baffle plate 18. Horizontal baffle plate 18 extends to the vertical walls 11 of reactor 10 and is connected thereto. A sealant, such as asbestos wicking, employed in sufficient amount, prevents the fluids from passing between the side walls 11 of reactor 10 and horizontal baffle plate 18. Horizontal baffle plate 18 rests upon and is supported by either a ledge 21 or extensions, extending from the side walls 11 of reactor 10. Descending fluids touching the upper surface of horizontal baffle plate 17 are directed to the outer edge of horizontal baffle plate 17, from which they may again descend in reactor 10 until they contact hroizontal baffle plate 18. Horizontal baffle plate 18, along with the vertical walls 11 of reactor 10, directs the fluids towards the vertical axis of reactor 10. The fluids pass between swirl vanes 19, horizontal baffle plate 17, and horizontal baffle plate 18 towards the vertical axis of reactor 10. The swirl vanes tend to import a swirling motion to the moving fluids, which can only pass through the circular central opening 20 of horizontal baffle plate 18.

Swirl vanes 19 are firmly connected to the bottom side of horizontal baffle plate 17. These swirl vanes rest upon and are supported by the top side of horizontal baffle plate 18 and may be or may not be physically attached to the top side of horizontal baffle plate 18. In this particular embodiment of the apparatus of the present invention, six swirl vanes 19 are connected to the bottom side of horizontal baffle plate 17.

Four swirl vanes 22 are connected to the bottom side of horizontal baffle plate 18 and extend from the circular central opening 20 to the outer edge of horizontal baffle plate 23, as shown in the figures. The swirl vanes 22 are connected to the top side of horizontal baffle plate 23. Horizontal baffle plate 23 is the bottom horizontal baffle plate, or third horizontal baffle plate, and has a circular cross-section and a diameter that is greater than the diameter of central opening 20 in horizontal baffle plate 18.

The fluids pass through circular central opening 20 in a downward direction, impinging upon the top of horizontal baffle plate 23 and are directed outwardly through swirl vanes 22 between horizontal baffle plate 18 and horizontal baffle plate 23. The swirl vanes 22 tend to promote the swirling motion of the fluids. The fluids being emitted through swirl vanes 22 into reactor 10 are directed by the bottom of horizontal baffle plate 18 and the side walls 11 of reactor 10 in a downward direction, to be processed further in a lower section of reactor 10.

In FIG. 5 is shown an alternative bottom baffle that may be used in the place of horizontal baffle plate 23. This alternative bottom baffle is an inverted conical baffle 24 having swirl vanes 25.

EXAMPLE II

Another embodiment of the apparatus of the present invention is presented in FIGS. 6 through 9.

A light gas oil is hydrocracked in vertical reactor 26, which has vertical side walls 27. The light gas oil and a hydrogen-affording gas pass through catalyst bed 28. The gas oil is partially converted into useful products. The unconverted feed, hydrogen-affording gas, and products that are produced in catalyst bed 28 pass through catalyst bed 28 and catalyst-bed-support 29. Hydrogen quench gas passes through quench line 30 and quench-gas distributor 31 to be introduced into reactor 26 from distributor 31 through apertures 32. The quench gas is contacted with the partially processed fluids descending from catalyst-bed support 29. The fluids then descend in reactor 26 to contact an embodiment of the apparatus of the present invention, which apparatus comprises 4 horizontal baffle plates, horizontal baffle plates 33, 34, 38, and 41, and three sets of swirl vanes, said horizontal baffle plates and sets of swirl vanes being assembled as shown in FIGS. 6 through 9.

The fluids descend in reactor 26 until they contact horizontal baffle plates 33, 34, and 38. Horizontal baffle plate 33 is the top horizontal baffle plate. Horizontal baffle plate 34 is the top intermediate horizontal baffle plate. Horizontal baffle plate 38 is the bottom intermediate horizontal baffle plate. The descending fluids that touch the upper surface of horizontal baffle plate 33 are directed to the outer edge of horizontal baffle plate 33, from which they may again descend in reactor 26 until they contact either horizontal baffle plate 34 or horizontal baffle plate 38. Some of the fluids may pass between horizontal baffle plate 33 and horizontal baffle plate 34 and swirl vanes 35 to be directed in a swirling motion through central opening 36 in horizontal baffle plate 34. The other segment of the descending fluids, that is, the fluids which are still descending in reactor 26 and which have not been directed toward the vertical axis of the reactor 26, make contact with horizontal baffle plate 38 and are directed by said horizontal baffle plate 38 and the vertical walls 27 of reactor 26 toward the vertical axis of reactor 26 between swirl vanes 37, horizontal baffle plate 34, and horizontal baffle plate 38. Horizontal baffle plate 38 extends to the vertical walls 27 of reactor 26 and is connected thereto. A sealant, such as asbestos wicking, is employed to prevent fluids from passing between the side walls 27 and horizontal baffle plate 28. Horizontal baffle plate 38 rests upon and is supported by ledge 39. Horizontal baffle plate 38 has a central opening 40 which need not be equivalent in size to central opening 36 in horizontal baffle plate 34. The fluids passing through opening 36 in horizontal baffle plate 34 and fluids passing towards the vertical axis of reactor 26 by way of swirl vanes 37, horizontal baffle plate 34, and horizontal baffle plate 38 can only pass through circular opening 40 in horizontal baffle plate 38. Swirl vanes 37 are curved in a direction that is opposite the direction in which swirl vanes 35 are curved. In this particular embodiment of the apparatus of the present invention, there are 6 swirl vanes 35 and 6 swirl vanes 37. Moreover, 4 swirl vanes 41 are connected to the bottom side of horizontal baffle plate 38 and extend from the circular central opening 40 of horizontal baffle plate 38 to the outer edge of horizontal baffle plate 41, which is the bottom horizontal baffle plate and is located directly below central opening 40 of horizontal baffle plate 38. The swirl vanes 42 are connected to the top side of horizontal baffle plate 41, which has a circular cross-section and a diameter that is greater than the diameter of central opening 40 in horizontal baffle plate 38.

The fluids pass through circular central opening 40 in a downward direction to be impinged upon the top of horizontal baffle plate 41 and are directed outwardly through swirl vanes 42 between horizontal baffle plate 38 and horizontal baffle plate 41. The fluids passing through swirl vanes 42 into reactor 26 are directed by the bottom of horizontal baffle plate 38 and the side walls 27 of reactor 26 in a downward direction to be processed further in a lower section of reactor 26.

The use of either of the embodiments of the apparatus of the present invention, which embodiments are presented hereinabove in the examples, will promote and provide improved mixing of the quench gas and the fluids passing through the reactor. It is contemplated that such apparatus would be employed in each of those spaced between catalyst beds in a reactor into which quench gas is being introduced.

The above examples are presented for the purpose of illustration only and are not intended to limit the scope of the present invention.

what is claimed is:

1. An apparatus for mixing fluids in a vessel between beds of solid contact material located in said vessel, which apparatus comprises: a first baffle which is centrally positioned from the walls of said vessel that are parallel to the flow of fluids through said vessel vessel; a second baffle having a central opening and being positioned downstream said first baffle such that said first baffle is located directly opposite said central opening of said second baffle on the upstream side of said second baffle, the cross-sectional area of said first baffle being greater than the cross-sectional area of said central opening of said second baffle and said second baffle extending to said walls, said first baffle and second baffle being perpendicular to the flow of fluids through said vessel; a first plurality of swirl vanes connected to said first baffle on the downstream side of said first baffle, said first plurality of swirl vanes being supported on said second baffle and being positioned in a manner that will direct fluids that are passing through said vessel and between said first baffle and said second baffle in a swirling motion toward the axis of said vessel that is parallel to the flow of fluids through said vessel and subsequently through said central opening in said second baffle; a second plurality of swirl vanes connected to the downstream side of said second baffle; and a third baffle that is positioned on the downstream side of said second baffle directly opposite said central opening of said second baffle and that is firmly attached to said second plurality of swirl vanes, said second plurality of swirl vanes being positioned to direct in a swirling manner the fluids which are passing through said central opening of said second baffle and which are impinging upon the upstream side of said third baffle toward said walls of said vessel.

2. The apparatus of claim 1 wherein the cross-sectional area of said third baffle is greater than the cross-sectional area of said central opening of said second baffle.

3. The apparatus of claim 1 wherein said baffle and said third baffle have circular cross sections and said central opening of said second baffle has a circular cross section.

4. The apparatus of claim 1 wherein said first baffle and said second baffle are plates and said plates are parallel to one another.

5. The apparatus of claim 2 wherein said first baffle and said third baffle have circular cross sections and said central opening of said second baffle has a circular cross section.

6. The apparatus of claim 2 wherein said first baffle and said second baffle are plates and said plates are parallel to one another.

7. The apparatus of claim 3 wherein said first baffle and said second baffle are plates and said plates are parallel to one another.

8. The apparatus of claim 5 wherein said first baffle and said second baffle are plates and said plates are parallel to one another.

9. The apparatus of claim 8 wherein either or both of said first baffle and said third baffle are connected to said walls in a manner that will permit fluids to pass around said connected baffle or baffles in the direction of flow of said fluids through said vessel.

10. An apparatus for mixing fluids in a vessel between beds of catalyst located in said vessel, which apparatus comprises: a first baffle which is centrally positioned from the walls of said vessel that are parallel to the flow of fluids through said vessel; a second baffle having a central opening and being positioned downstream from said first baffle such that said first baffle is located directly opposite said central opening of said second baffle on the upstream side of said second baffle, the cross-sectional area of said first baffle being greater thatn the cross-sectional area of said central opening of said second baffle, said first baffle and said second baffle being perpendicular to the flow of fluids through said vessel; a first plurality of swirl vanes connected to said first baffle on the downstream side of said first baffle, said first plurality of swirl vanes being supported on said second baffle and being positioned in a manner that will direct fluids that are passing through said vessel and between said first baffle and said second baffle in a swirling motion toward the axis of said vessel that is parallel to the flow of fluids through said vessel and subsequently through said central opening in said second baffle; a third baffle having a central opening and being positioned downstream from said second baffle such that the central opening of said third baffle and the central opening of said second baffle are opposite one another, the cross-sectional area of said central opening of said third baffle being at least as great as the cross-sectional area of said central opening of said second baffle, said third baffle extending to said walls of said vessel; a second plurality of swirl vanes connected to said second baffle on the downstream side of said second baffle and connected to said third baffle on the upstream side of said third baffle, said second plurality of swirl vanes being curved in a direction that is opposite to the direction in which said first plurality of swirl vanes is curved, said second plurality of swirl vanes being positioned to direct fluids passing between said second baffle and said third baffle in a swirling manner toward the axis of said vessel that is parallel to the flow of fluids through said vessel and subsequently through said central opening of said third baffle; a third plurality of swirl vanes connected to the downstream side of said third baffle; and a fourth baffle that is positioned on the downstream side of said third baffle directly opposite said central oening of said third baffle and that is firmly attached to said third plurality of swirl vanes, said third plurality of swirl vanes being positioned to direct the fluids that are passing through said central opening of said third baffle and that are impinging upon the top of said fourth baffle in a swirling motion toward said walls of said vessel.

11. The apparatus of claim 10 wherein the cross-sectional area of said fourth baffle is greater than the cross-sectional area of said central opening of said third baffle.

12. The apparatus of claim 10 wherein said first baffle, said second baffle, said fourth baffle, said central opening of said second baffle, and said central opening of said third baffle all have circular cross sections.

13. The apparatus of claim 10 wherein said first baffle, said second baffle, and said third baffle are plates.

14. The apparatus of claim 11 wherein said first baffle, said second baffle, said fourth baffle, said central opening of said second baffle, and said central opening of said third baffle all have circular cross sections.

15. The apparatus of claim 11 wherein said fourth baffle is a plate.

16. The apparatus of claim 13 wherein said fourth baffle is a plate.

17. The apparatus of claim 14 wherein said fourth baffle is a plate.

18. The apparatus of claim 14 wherein one or more of baffles including said first baffle, said second baffle, and said fourth baffle are connected to said walls in a manner that will permit fluids to pass around said connected baffles in the direction of flow of said fluids through said vessel.

19. An apparatus for mixing fluids in a vessel between beds of catalyst located in said vessel, which apparatus comprises: a first baffle which is centrally positioned from the walls of said vessel that are parallel to the flow of fluids through said vessel; a second baffle having a central opening and being positioned downstream from said first baffle such that said first baffle is located directly opposite said central opening of said second baffle on the upstream side of said second baffle, the cross-sectional area of said first baffle being greater than the cross-sectional area of said central opening of said second baffle, said first baffle and said second baffle being perpendicular to the flow of fluids through said vessel; a first plurality of swirl vanes connected to said first baffle on the downstream side of said first baffle, said firs plurality of swirl vanes being supported on said second baffle and being positioned in a manner that will direct fluids that are passing through said vessel and between said first baffle and said second baffle in a swirling motion toward the axis of said vessel that is parallel to the flow of fluids through said vessel and subsequently through said central opening in said second baffle; a third baffle having a central opening and being positioned downstream from said second baffle such that the central opening of said third baffle and the central opening of said second baffle are opposite one another, the cross-sectional area of said central opening of said third baffle being at least as great as the cross-sectional area of said central opening of said second baffle, said third baffle extending to said walls of said vessel; a second plurality of swirl vanes connected to aid second baffle on the downstream side of said second baffle and connected to said third baffle on the upstream side of said third baffle, said second plurality of swirl vanes being curved in a direction that is opposite to the direction in which said first plurality of swirl vanes is curved, said second plurality of swirl vanes being positioned to direct fluids passing between said second baffle and said third baffle in a swirling manner toward the axis of said vessel that is parallel to the flow of fluids through said vessel and subsequently through said central opening of said third baffle; a third plurality of swirl vanes connected to the downstream side of said third baffle; and a fourth baffle that is connected to said third baffle and is positioned on the downstream side of said third baffle directly opposite said central opening of said third baffle and that is firmly attached to a third plurality of swirl vanes, said third plurality of swirl vanes being positioned to direct the fluids that are passing through said central opening of said third baffle and that are impinging upon the top of said fourth baffle in a swirling motion toward said walls of said vessel, said fourth baffle being an inverted conical baffle having its apex toward the downstream side of said third baffle and being curved in such a manner as to direct the fluids outwardly from the axis of said vessel towards said walls of said vessel.

* * * * *

UNITED STATES PATENT OFFICE
CERTIFICATE OF CORRECTION

Patent No. 3,787,189            Dated January 22, 1974

Inventor(s) Donald L. Muffat et. al.

It is certified that error appears in the above-identified patent and that said Letters Patent are hereby corrected as shown below:

Column 10, line 40, "spaced" should be -- spaces --.
            line 50, "vessel vessel" should be -- vessel --.

Column 11, line 52, "thatn" should be -- than -- .

Column 12, line 20, "oening" should be -- opening --.

Column 13, line 1, "firs" should be -- first --;
            line 17, "aid" should be -- said --.

Signed and sealed this 6th day of August 1974.

(SEAL)
Attest:

McCOY M. GIBSON, JR.
Attesting Officer

C. MARSHALL DANN
Commissioner of Patents